(12) United States Patent
Sieker et al.

(10) Patent No.: US 6,346,205 B2
(45) Date of Patent: Feb. 12, 2002

(54) RIGID POLYURETHANE FOAMS

(75) Inventors: Thomas Heinrich Sieker, Deggendorf (DE); Franco Gabrieli, Brebbia (IT)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 09/761,838

(22) Filed: Jan. 18, 2001

Related U.S. Application Data

(62) Division of application No. 08/953,260, filed on Oct. 17, 1997, now Pat. No. 6,207,725.

(30) Foreign Application Priority Data

Nov. 4, 1996 (EP) .............................................. 96117644

(51) Int. Cl.$^7$ ................................................ C09K 3/00
(52) U.S. Cl. ........................... 252/182.24; 252/182.26; 252/182.27; 252/182.28
(58) Field of Search ....................... 252/182.24, 182.26, 252/182.27, 182.28

(56) References Cited

U.S. PATENT DOCUMENTS

| | | | |
|---|---|---|---|
| 3,645,925 A | 2/1972 | Speranza et al. |
| 3,661,808 A | 5/1972 | Kennedy |
| 3,980,594 A | 9/1976 | Fabris et al. |
| 4,228,248 A | 10/1980 | Zimmerman |
| 4,758,605 A | 7/1988 | Williams |
| 4,760,101 A | 7/1988 | Fechter et al. |
| 4,972,002 A | 11/1990 | Volkert |
| 4,981,879 A | 1/1991 | Snider |
| 4,983,320 A | 1/1991 | Franklin et al. |
| 5,034,424 A | 7/1991 | Wenning et al. |
| 5,100,927 A | 3/1992 | Tamano et al. |
| 5,430,071 A | 7/1995 | Green et al. |
| 5,484,817 A | 1/1996 | Patterson |
| 5,489,618 A | 2/1996 | Gerkin |
| 5,527,876 A | 6/1996 | Kluth et al. |
| 5,550,168 A | 8/1996 | Nakamura et al. |
| 5,561,172 A | 10/1996 | Omure et al. |
| 5,563,180 A | 10/1996 | Skowronski et al. |
| 5,591,780 A | 1/1997 | Muha et al. |
| 5,591,781 A | 1/1997 | Yshimura et al. |
| 5,840,779 A | 11/1998 | Parker et al. |

FOREIGN PATENT DOCUMENTS

| | | |
|---|---|---|
| DE | 44 44 249 | 10/1961 |
| EP | 0 498 628 | 8/1992 |
| EP | 0 508 649 | 10/1992 |
| GB | 839 185 | 6/1960 |
| GB | 879 167 | 10/1961 |
| GB | 1 534 236 | 11/1978 |
| JP | 03/160015 | 7/1991 |
| WO | 95/18176 | 7/1995 |

OTHER PUBLICATIONS

D.W. Dedeaux et al., "TEXACAT Catalysts in Water Blown Rigid Foam", 34$^{th}$ PU Conference; (Oct. 1992) p. 341.

Primary Examiner—John M. Cooney, Jr.
(74) Attorney, Agent, or Firm—Pillsbury Winthrop LLP

(57) ABSTRACT

Process for making rigid polyurethane or urethane-modified polyisocyanurate foams comprising the step of reacting an organic polyisocyanate composition with an isocyanate-reactive composition comprising a polyester polyol in the presence of an amine catalyst characterised in that the $pK_a$ of the conjugated ammonium salt of said amine is less than 12.

8 Claims, 3 Drawing Sheets

RIGID POLYURETHANE FOAMS

This is a division of application Ser. No. 08/953,260 filed Oct. 17. 1997, now U.S. Pat. No. 6,207,725.

This invention relates to rigid polyurethane or urethane-modified polyisocyanurate foams, to processes for their preparation and to polyol blends for use in said processes.

Rigid polyurethane and urethane-modified polyisocyanurate foams are in general prepared by reacting a stoichiometric excess of polyisocyanate with isocyanate-reactive compounds in the presence of blowing agents, surfactants and catalysts. One use of such foams is as a thermal insulation medium in, for example, buildings.

Polyether polyols or polyester polyols are generally used as isocyanate-reactive compounds. Polyester polyols impart excellent flame retardancy characteristics to the resulting polyurethane foams and can in some cases even be less expensive than polyether polyols.

Tertiary amines are generally used as catalyst in rigid polyurethane foam systems based on polyester polyols. A problem encountered when using tertiary amine catalysts in these polyester rigid foam systems is that a cross-linked mass is obtained at a time when the foam has not fully filled the cavity yet (for example, of a laminated building panel). This leads to dimensional stability problems due to density distribution problems and cell stretching of the obtained foam.

Therefore it is an object of the present invention to provide a process for making rigid polyurethane foams based on polyester polyols not showing the disadvantages mentioned above.

According to the present invention a process for making rigid polyurethane or urethane-modified polyisocyanurate foams is provided by reacting an organic polyisocyanate composition with an isocyanate-reactive composition comprising a polyester polyol in the presence of an amine catalyst (B) characterised in that the $pK_a$ of the conjugated ammoniumsalt of the amine ($BH^+$) is less than 12, preferably less than 10, more preferably less than 8.

$$pK_a = -\log K_a = -\log [B][H^+]/[BH^+]$$

An acceptable rise profile is obtained having a fast initial foam rise leading to a smooth processability resulting in a better density distribution, lower minimum stable density and fill weights and higher compression strength of the foam.

Figure 1:
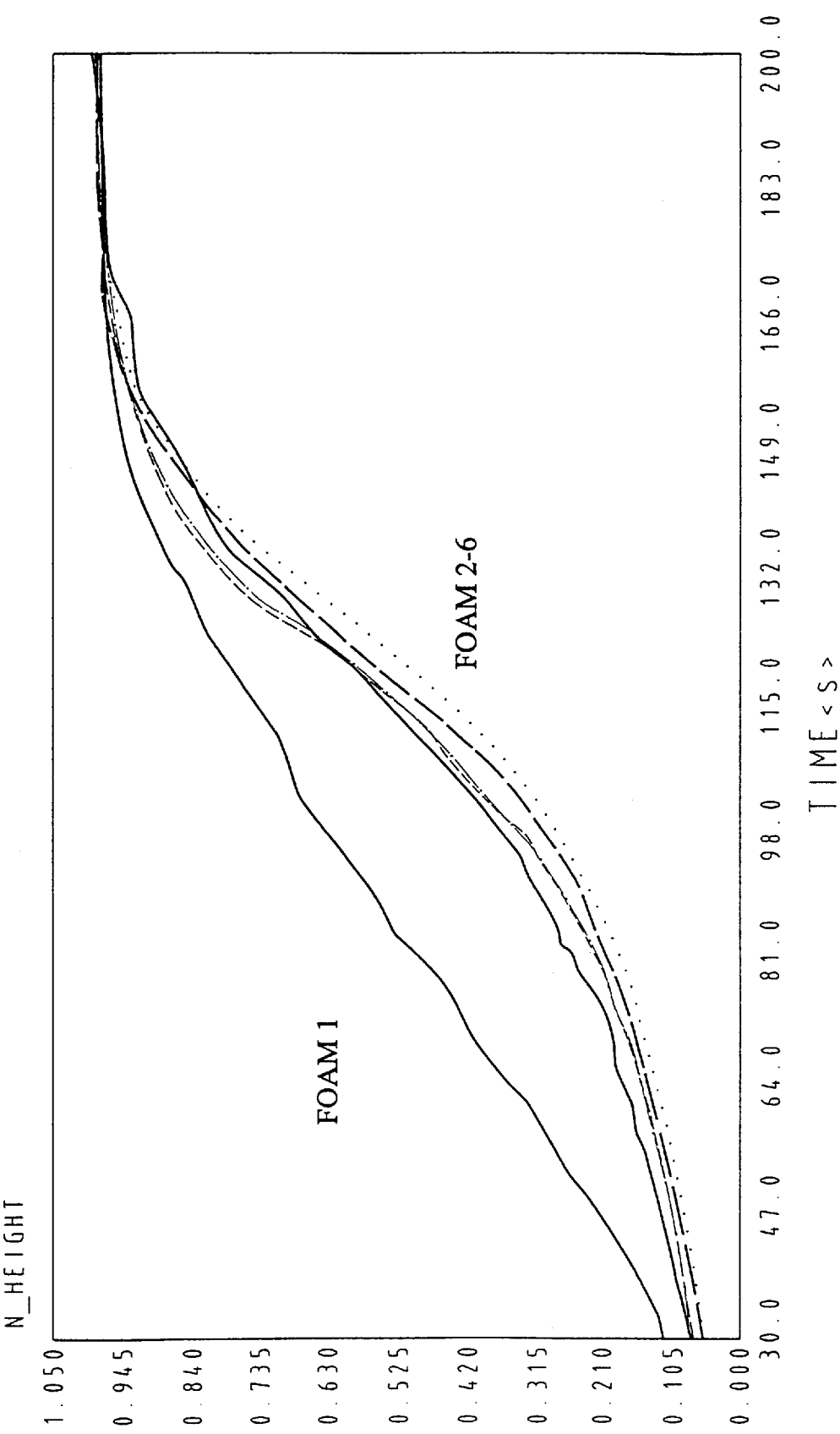
FIG. 1–3 demonstrate various rise profiles of foams of the invention and the prior art expressed as weight of the rising foams versus the reaction time.

Preferred catalystst of the present invention include aliphatic or aromatic tertiary amines preferably containing a supplemental heteroatom in the ring or functional groups having a positive inductive and/or positive mesomeric effect (for example, alkyl groups or amino groups). Examples include 2,2'-dimorpholinodiethylether, Texacat DP-914 (available from Texaco Chemical), N,N-dimethylpiperazine, 1-methylimidazole, 2-methyl-1-vinylimidazole, 1-allylimidazole, 1-phenylimidazole, 1,2,4,5-tetramethylimidazole, 1(3-aminopropyl)imidazole, pyrimidazole, 4-dimethylaminopyridine, 4-pyrrolidinopyridine, 4-morpholinopyridine, 4-methylpyridine, N-dodecyl-2-methylimidazole and triazines such as tris(dimethylaminopropyl)hexahydrotriazine. Especially preferred catalysts are 2,2'-dimorpholinodiethylether, Texacat DP-914, 1-methylimidazole and 4-dimethylaminopyridine. One or more of the above described catalysts can be used in the process of the present invention.

Some of the above described catalysts are known in polyurethane foam production primarily for flexible foam production (see, for example, U.S. Pat. No. 5430071, U.S. Pat. No. 3645925, U.S. Pat. No. 3661808, U.S Pat. No. 4228248, EP 672696, EP 401787). Their use in rigid polyurethane foam systems based on polyester polyols has not been described heretobefore.

In general, the catalysts described above are used according to the invention in an amount of between 0.05 and 5%, preferably between 0.1 and 4% by weight based on the isocyanate-reactive composition.

In addition to the above described catalyst other catalysts known in rigid polyurethane foam production can be used. These include aliphatic tertiary amines having $pK_a$ values above 12. Examples of additional amine catalysts include dimethylbenzylamine, bis-dimethylaminoethylether (Niax A1 available from OSi) and pentamethyl diethylenetriamine (Desmorapid PV available from BASF). Especially addition of Desmorapid PV is preferred; the reaction profile is further smoothen. Said additional catalysts are generally used in amounts varying between 0.01 and 5%, preferably between 0.05 and 2% by weight based on the isocyanate-reactive composition.

The term "polyester polyol" as used herein is meant to include any polyester polyol having a hydroxyl functionality of at least two wherein the majority of the recurring units contain ester linkages and the molecular weight is at least 400.

The polyester polyols for use in the present invention advantageously have an average functionality of about 1.8 to 8, preferably about 2 to 6 and more preferably about 2 to 2.5. Their hydroxyl number values generally fall within a range of about 15 to 750, preferably about 30 to 550 and more preferably about 200 to 550 mg KOH/g. The molecular weight of the polyester polyol generally falls within the range of about 400 to about 10000, preferably about 1000 to about 6000. Preferably the polyester polyols have an acid number between 0.1 and 20 mg KOH/g; in general the acid number can be as high as 90 mg KOH/g.

The polyester polyols of the present invention can be prepared by known procedures from a polycarboxylic acid or acid derivative, such as an anhydride or ester of the polycarboxylic acid, and any polyhydric alcohol. The polyacid and/or polyol components may be used as mixtures of two or more compounds in the preparation of the polyester polyols.

The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. A preferred polyol component is a glycol. The glycols may contain heteroatoms (e.g., thiodiglycol) or may be composed solely of carbon, hydrogen and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. Examples of suitable polyhydric alcohols include: ethylene glycol, propylene glycol-(1,2) and -(1,3), butylene glycol-(1,4) and -(2,3), hexanediol-(1,6), octanediol-(1,8), neopentyl glycol, 1,4-bishydroxymethyl cyclohexane, 2-methyl-1,3-propane diol, glycerin, trimethylolethane, hexanetriol-(1,2,6), butanetriol-(1,2,4), quinol, methyl glucoside, triethyleneglycol, tetraethylene glycol and higher polyethylene glycols, dipropylene glycol and higher polypropylene glycols, diethylene glycol, glycerol, pentaerythritol, trimethylolpropane, sorbitol, mannitol, dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol, tetramethylene glycol and 1,4-cyclohexanedimethanol (1,4-bis-hydroxymethylcyclohexane).

The polycarboxylic acid component may be aliphatic, cycloaliphatic, aromatic and/or heterocyclic and may optionally be substituted, for example, by halogen atoms and/or may be unsaturated. Examples of suitable carboxylic acids and derivatives thereof for the preparation of the polyester polyols include: oxalic acid, malonic acid, adipic acid, glutaric acid, succinic acid, pimelic acid, suberic acid, azelaic acid, sebacic acid, phthalic acid, phthalic acid anhydride, terephthalic anhydride, isophthalic acid, terephthalic acid, trimellitic acid, tetrahydrophthalic acid anhydride, pyromellitic dianhydride, hexahydrophthalic acid anhydride, tetrachlorophthalic acid anhydride, endomethylene tetrahydrophthalic acid anhydride, glutaric acid anhydride, maleic acid, maleic acid anhydride, terephthalic acid dimethylester, terephthalic acid-bis glycol ester, fumaric acid, dibasic and tribasic unsaturated fatty acids optionally mixed with monobasic unsaturated fatty acids, such as oleic acids.

While the polyester polyols can be prepared from substantially pure reactant materials, more complex ingredients can be used, such as the side-stream, waste or scrap residues from the manufacture of phthalic acid, terephthalic acid, dimethyl terephthalate, polyethylene terephthalate, and the like. These compositions can be converted by reaction with polyols to polyester polyols through conventional transesterification or esterification procedures.

The production of the polyester polyols is accomplished by simply reacting the polycarboxylic acid or acid derivative with the polyol component in a known manner until the hydroxyl and acid values of the reaction mixture fall in the desired range. After transesterification or esterification the reaction product can optionally be reacted with an alkylene oxide.

The term "polyester polyol" as used herein includes any minor amounts of unreacted polyol remaining after the preparation of the polyester polyol and/or unesterified polyol (e.g., glycol) added after the preparation. The polyester polyol can advantageously include up to about 40% by weight free glycol. Preferably the free glycol content is from 2 to 30, more preferably from 2 to 15% by weight of the total polyester polyol component.

Aliphatic and/or aromatic polyester polyols can be used according to the present invention. Mixtures of two or more different polyester polyols may be used.

According to the present invention the polyester polyols described above can constitute the totality of the reactive mixture reacted with the polyisocyanate; it is understood, however, that these polyols could also be used mixed with other isocyanate-reactive compounds conventionally used in the art; preferably at least 10% by weight, more preferably at least 20% by weight of the total isocyanate-reactive compounds are polyester polyols as described above.

The isocyanate-reactive compounds which can be employed in combination with the polyester polyols in the preparation of the rigid polyurethane foams of the present invention include any of those known in the art for that purpose. Of particular importance for the preparation of rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Further suitable polymeric polyols include hydroxyl terminated polythioethers, polyamides, polyesteramides, polycarbonates, polyacetals, polyolefins and polysiloxanes.

Any of the blowing agents known in the art for the preparation of rigid polyurethane or urethane-modified polyisocyanurate foams can be used in the process of the present invention. Such blowing agents include water or other carbon dioxide-evolving compounds, or inert low boiling compounds having a boiling point of above −70° C. at atmospheric pressure.

Where water is used as blowing agent, the amount may be selected in known manner to provide foams of the desired density, typical amounts being in the range from 0.05 to 5% by weight based on the total reaction system.

Suitable inert blowing agents include those well known and described in the art, for example, hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

Examples of preferred blowing agents include isobutane, n-pentane, isopentane, cyclopentane or mixtures thereof, 1,1-dichloro-2-fluoroethane (HCFC 14 lb), 1,1-trifluoro-2-fluoroethane (HFC 134a), chlorodifluoro-methane (HCFC 22), 1,1-difluoro-3,3,3-trifluoropropane (HFC 245fa). Particular mention may be made of blowing agent mixtures as described in PCT Patent Publication No. 96/12758, incorporated herein by reference, for manufacturing low density, dimensionally stable rigid foam. These blowing agent mixtures generally comprise at least 3 and preferably at least 4 components of which preferably at least one is a (cyclo)alkane (preferably of 5 or 6 carbon atoms) and/or acetone.

The blowing agents are employed in an amount sufficient to give the resultant foam the desired bulk density which is generally in the range 15 to 70 kg/m$^3$, preferably 20 to 50 kg/m$^3$, most preferably 25 to 40 kg/m$^3$. Typical amounts of blowing agents are in the range 2 to 25% by weight based on the total reaction system.

When a blowing agent has a boiling point at or below ambient it is maintained under pressure until mixed with the other components. Alternatively, it can be maintained at subambient temperatures until mixed with the other components.

Other optional additives for the polyol blends of the present invention include crosslinking agents, for examples low molecular weight polyols such as triethanolamine, processing aids, viscosity reducers, dispersing agents, plasticizers, mold release agents, antioxidants, fillers (e.g. carbon black), cell size regulators such as insoluble fluorinated compounds (as described, for example, in U.S. Pat. No. 4981879, U.S. Pat. No. 5034424, U.S. Pat. No. 4972002, EP 0508649, EP 0498628, WO 95/18176), non-amine polyurethane catalysts (e.g. stannous salts of carboxylic acids), trimerisation catalysts (e.g. alkali metal carboxylic acid salts), surfactants such as polydimethylsiloxanepolyoxyalkylene block copolymers and non-reactive and reactive fire retardants, for example halogenated alkyl phosphates such as tris chloropropyl phosphate, triethylphosphate, diethylethylphosphonate and dimethylmethylphosphonate. The use of such additives is well known to those skilled in the art.

Another useful additive particularly to further improve the reaction profile is an organic carboxylic acid, especially a carboxylic acid containing at least one OH, SH, $NH_2$ or NHR functional group, wherein R is an alkyl, cycloalkyl or aryl group. Such carboxylic acids have the general formula $X_n$—R'—$(COOH)_m$ wherein X is OH, SH, $NH_2$ or NHR, R' is an at least divalent hydrocarbon moiety, typically an at least divalent linear or branched aliphatic hydrocarbon moiety and/or an at least divalent alicyclic or aromatic hydrocarbon moiety, n is an integer having a value of at least 1 and allows for mono and polyfunctional substitution on the hydrocarbon moiety, m is an integer having a value of at least 1 and allows for mono and polycarboxyl substitution on the hydrocarbon moiety. The "at least divalent hydrocarbon moiety" can be a saturated or unsaturated moiety of 1 to 20 carbon atoms, including a linear aliphatic moiety, a branched aliphatic moiety, an alicyclic moiety or an aromatic moiety. Stated otherwise, R' can, for example, be a linear or branched alkylene group of 1 to 10 carbon atoms, a cyclic alkylene group of 4 to 10 carbon atoms, or an arylene, an alkarylene or an ararylene group of 6 to 20 carbon atoms. Specific non-limiting examples of suitable hydrocarbon moieties are methylene, ethylene, n-propylene, isopropylene, n-butylene, isobutylene, n-amylene, n-decylene, 2-ethylhexylene, o-, m-, p-phenylene, ethyl-p-phenylene, 2,5-naphthylene, p,p'-biphenylene, cyclopentylene, cycloheptylene, xylylene, 1,4-dimethylenephenylene and the like. While above-noted radicals have two available substitution sites, at least one for a carboxyl group and one for a OH, SH, $NH_2$ or NHR group, it is contemplated that additional hydrogens on the hydrocarbon could be replaced with further carboxyl and/or OH, SH, NH2 or NHR groups. Such carboxylic acids generally have molecular weights below about 250.

The following carboxylic acids are especially suitable: citric acid, dimethylolpropionic acid, 2-hydroxymethylpropionic acid, bishydroxypropionic acid, salicylic acid, m-hydroxy benzoic acid, p-hydroxy benzoic acid, dihydroxybenzoic acid, glycolic acid, β-hydroxybutyric acid, cresotic acid, 3-hydroxy-2-naphthoic acid, lactic acid, tartaric acid, malic acid, resorcylic acid, hydroferulic acid, glycine, alanine, mercaptoacetic acid and the like. Preferably X is OH, n is 1, R' is a linear or branched aliphatic hydrocarbon having 1 to 5 carbon atoms and m is 1, 2 or 3. Most preferred carboxylic acids are lactic acid, glycolic acid, malic acid and citric acid. At least one of said carboxylic acids is used; mixtures of two or more of these acids can be used as well. Particularly preferred carboxylic acids are malic acid or a combination of malic acid and citric acid, preferably in a weight ratio of between 75:25 and 25:75, most preferably in a weight ratio of about 1:1. The carboxylic acid is generally used in an amount ranging from 0.1 to 5% by weight based on the isocyanate-reactive composition, preferably about 1% to 3%.

Suitable organic polyisocyanates to be reacted with the isocyanate-reactive composition to form rigid polyurethane or urethane-modified polyisocyanurate foams include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane. Further suitable polyisocyanates for use in the process of the present invention are those described in EP-A-0320134. Modified polyisocyanates, such as carbodiimide or uretonimine modified polyisocyanates can also be employed. Still other useful organic polyisocyanates are isocyanate-terminated prepolymers prepared by reacting excess organic polyisocyanate with a minor amount of an active hydrogen-containing compound. Preferred polyisocyanates to be used in the present invention are the polymeric MDI's.

The quantities of the polyisocyanate composition and the polyfunctional isocyanate-reactive composition to be reacted can be readily determined by the man skilled in the art. In general the NCO:OH ratio falls within the range 0.85 to 1.40, preferably about 0.98 to 1.20. Also higher NCO:OH ratios (for example, up to 3.0) fall within the present invention.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metal.

It is convenient in many applications to provide the components for polyurethane production in pre-blended formulations based on each of the primary polyisocyanate and isocyanate-reactive components. In particular, many reaction systems employ a polyisocyanate-reactive composition which contains the major additives such as the catalyst and the blowing agent in addition to the polyisocyanate-reactive component or components.

Therefore the present invention also provides a polyfunctional isocyanate-reactive composition comprising a polyester polyol and an amine catalyst as defined above.

In order to stabilise said pre-blended systems (preferably hydroxy-)functionalised carboxylic acids as described above are preferably added.

The foams of the present invention are advantageously used for producing laminates whereby the foam is provided on one or both sides with a facing sheet. The laminates are advantageously made in a continuous or discontinuous manner by depositing the foam-forming mixture on a facing sheet and preferably placing another facing sheet on the deposited mixture. Any facing sheet previously employed to produce building panels can be employed and can be of a rigid or flexible nature.

The various aspects of this invention are illustrated, but not limited by the following examples in which the following ingredients are used:

Polyol A: a sorbitol initiated polyether polyol of OH value 460 mg KOH/g.
Polyol B: an aliphatic polyester polyol of OH value 356 mg KOH/g.
Polyol C: an aromatic amine initiated polyether polyol of OH value 495 mg KOH/g.
Polyol D: a brominated polyether polyol of OH value 310 mg KOH/g.
Polyol E: an aromatic polyester polyol of OH value 241 mg KOH/g.
Polyol F: an aliphatic polyester polyol of OH value 575 mg KOH/g.
Polyol G: a glycerol initiated polyether polyol of OH value 1122 mg KOH/g.
Fire retardant A: a chlorinated flame retardant.
Fire retardant B: a phosphorous based flame retardant.
Surfactant A: a silicone surfactant.
Surfactant B: a silicone surfactant.
DMP: dimethylpiperazine catalyst available from Aldrich.
NP: N-methyl-N'-2(dimethyl)aminoethylpiperazine catalyst available from Toyosoda Manufacturing.
NMM: N-methylmorpholine catalyst available from Janssen Chemica.
DMEA: N,N-dimethylethanolamine catalyst available from Air Products.
MM: 4(2-methoxyethyl)morpholine catalyst available from Huntsman.
NBM: N-butylmorpholine catalyst available from Huntsman.
NEM: N-ethylmorpholine catalyst available from Aldrich.
TEA: triethylamine catalyst available from BASF.
DMEA: dimethylbenzylamine catalyst available from Protex.
DMDEE: dimorpholinodiethylether catalyst available from Nitroil.
DMAP: dimethylaminopyridine catalyst available from Aldrich.
NMI: N-methyl imidazole catalyst available from BASF.
Polycat 41: tris(dimethylaminopropyl)hexahydrotriazine catalyst available from Air Products.
Polycat 43: an amine based catalyst salt available from Air Products.
Polycat 46: a potassium acetate catalyst available from Air Products.
Catalyst LB: a potassium acetate catalyst available from Bayer.
Niax A1: bis(dimethylaminoethyl)ether catalyst available from OSi.
Texacat DP914: a catalyst available from Texaco.
DMCHA: dimethylcyclohexylamine catalyst available from BASF.
Desmorapid PV: pentamethyldiethylenetriamine catalyst available from BASF.
DBTDL: dibutyltindilaurate catalyst.
SUPRASEC DNR: polymeric MDI available from Imperial Chemical Industries.
SUPRASEC 2085: polymeric MDI available from Imperial Chemical Industries.
SUPRASEC is a trademark of Imperial Chemical Industries.

EXAMPLE 1

Rigid polyurethane foams were made from a polyol composition and a polyisocyanate composition containing the ingredients listed below in Table 1 at an NCO index of 1.15. The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined. The results are also given in Table 1. The rise profile was also followed by Dynamic Flow Data analysis. Results are presented in FIGS. 1 and 2 expressing the height of the rising foam versus the reaction time.

Figure 2:
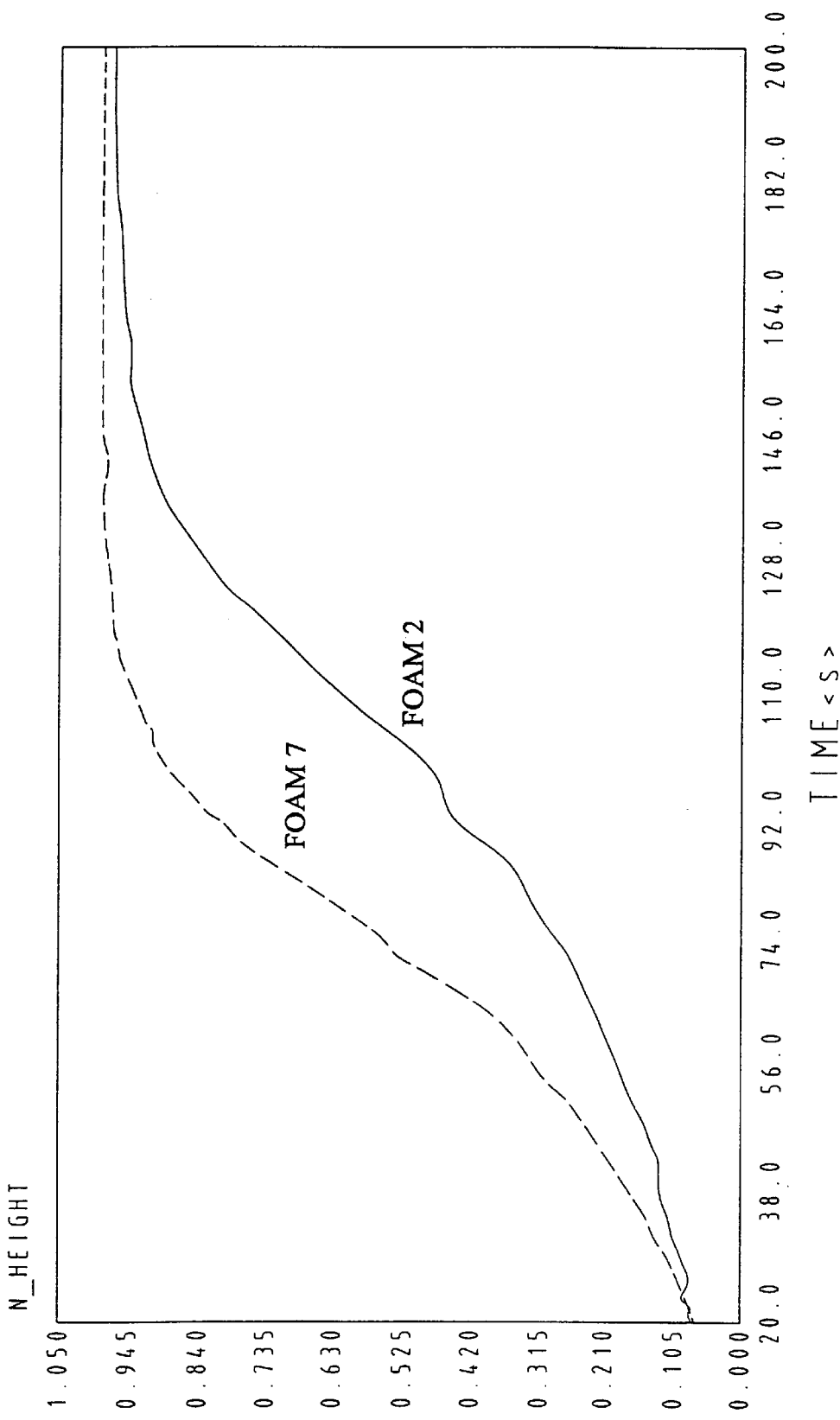

These results show that using amine catalysts according to the present invention (Foams no. 2 to 6) leads to improved reaction profiles compared to foams of the prior art (Foam No. 1) (see FIG. 1). Addition of selected classes of other catalysts such as Desmorapid PV (Foam No. 7) further improves the reaction profile (see FIG. 2).

TABLE 1

| Foam No. | | 1 | 2 | 3 | 4 | 5 | 6 | 7 | 8 |
|---|---|---|---|---|---|---|---|---|---|
| POLYOL | | | | | | | | | |
| Polyol A | pbw | 20.5 | 20.5 | 20.5 | 20.5 | 20.5 | 20.5 | 20.5 | 20.5 |
| Polyol B | pbw | 23.0 | 23.0 | 23.0 | 23.0 | 23.0 | 23.0 | 23.0 | 23.0 |
| Polyol C | pbw | 10.0 | 10.0 | 10.0 | 10.0 | 10.0 | 10.0 | 10.0 | 10.0 |
| Polyol D | pbw | 21.0 | 21.0 | 21.0 | 21.0 | 21.0 | 21.0 | 21.0 | 21.0 |
| glycolic acid | pbw | | | | | | | | 1.0 |
| lactic acid | pbw | | 1.1 | 1.1 | 1.1 | 1.1 | 1.1 | 1.1 | |
| Fire retardant A | pbw | 8.3 | 8.3 | 8.3 | 8.3 | 8.3 | 8.3 | 8.3 | 8.3 |
| Fire retardant B | pbw | 8.3 | 8.3 | 8.3 | 8.3 | 8.3 | 8.3 | 8.3 | 8.3 |
| Surfactant A | pbw | 2.0 | 2.0 | 2.0 | 2.0 | 2.0 | 2.0 | 2.0 | 2.0 |
| Desmorapid PV | pbw | | | | | | | 0.4 | |
| DMBA | pbw | 1.0 | 1.0 | 1.0 | 1.0 | 1.0 | 1.0 | 1.0 | 1.0 |
| DMDEE | pbw | | 1.5 | | | | | 0.4 | 1.5 |
| DMAP | pbw | | | | | 0.3 | | | |
| NMI | pbw | | | 0.3 | | | | | |
| Polycat 41 | pbw | | | | | | | 0.7 | |
| Niax A1 | pbw | 0.15 | | | | | | | |
| Texacat DP914 | pbw | | | | 0.5 | | | | |
| DMCHA | pbw | 0.80 | | | | | | | |
| water | pbw | 3.3 | 3.3 | 3.3 | 3.3 | 3.3 | 3.3 | 3.3 | 3.3 |
| HCFC 141b | pbw | 4.2 | 4.2 | 4.2 | 4.2 | 4.2 | 4.2 | 4.2 | 4.2 |

TABLE 1-continued

| Foam No. | | 1 | 2 | 3 | 4 | 5 | 6 | 7 | 8 |
|---|---|---|---|---|---|---|---|---|---|
| POLYISOCYANATE | | | | | | | | | |
| SUPRASEC DNR | pbw | 139 | 139 | 139 | 139 | 139 | 139 | 139 | 139 |
| Cream time | sec | 17 | 17 | 20 | 16 | 17 | 18 | 17 | 13 |
| String time | sec | 154 | 120 | 134 | 131 | 141 | 137 | 129 | 127 |
| Expansion factor at string time | % | 93 | 89 | 90 | 86 | 90 | 84 | 98 | 95 |

EXAMPLE 2

Figure 3:
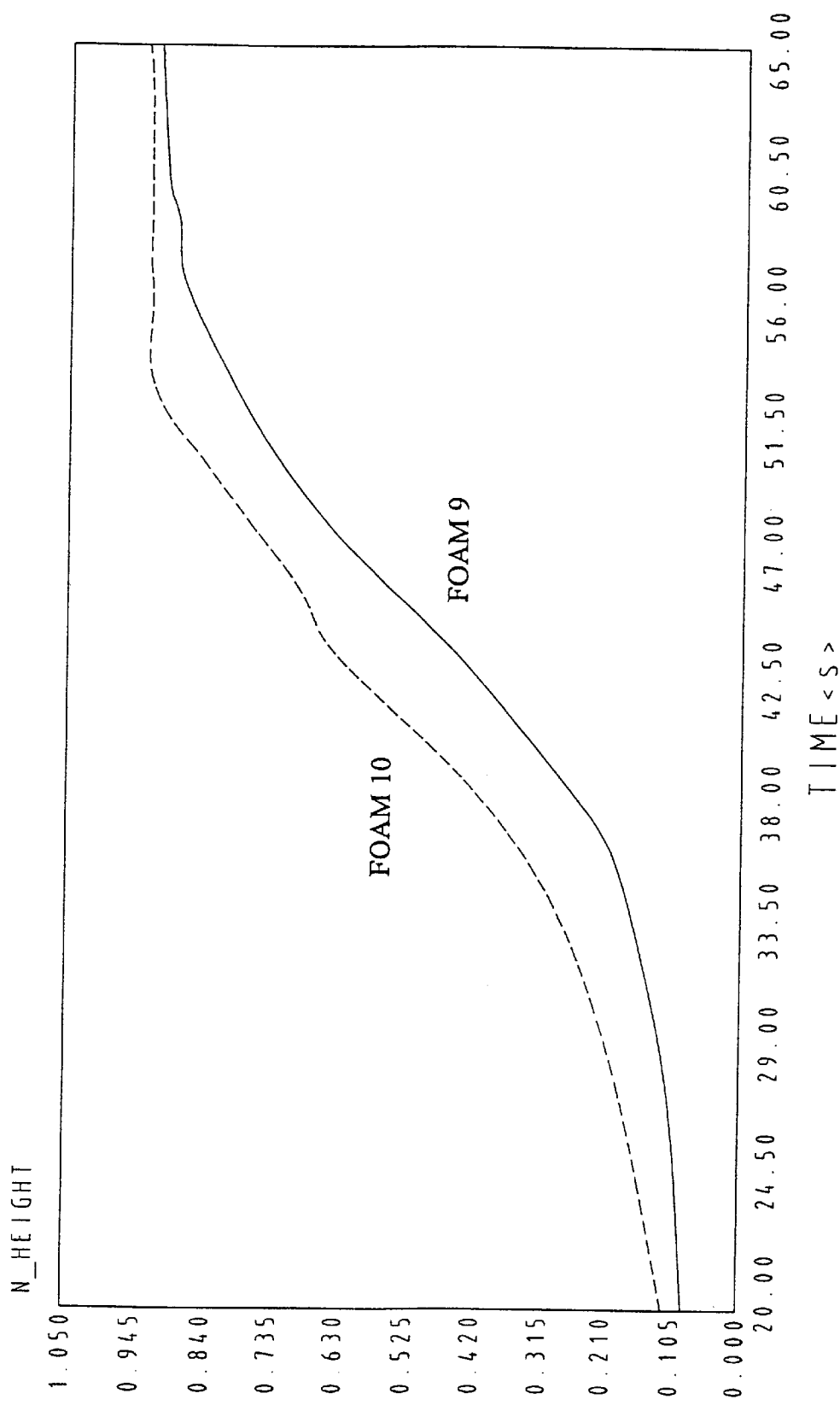

Rigid polyurethane foams were made from a polyol composition and a polyisocyanate composition containing the ingredients listed below in Table 2 at an NCO index of 2.20. The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined. The results are also given in Table 2. The rise profile was also followed by Dynamic Flow Data analysis. Results are presented in FIG. 3 expressing the height of the rising foam versus the reaction time.

EXAMPLE 3

Panels were made from the formulations 1, 2 and 7 as defined in Table 1 using a high pressure machine (Hennecke HK 650). Temperature of the chemicals: 20° C.; output: 681 g/sec; pressure: 150 bar. A horizontal mould of dimensions 330×100×10 cm was used with injection sidewards (right hand side) at the initial part thereof. Temperature of the mould: 37° C. Foams were made to an overpack density of 40 to 41 g/l. Foam No. 7 was also made at even higher overpack (Foam No. 7 bis). The following measurements were done on the obtained moulded foams: core and overall density (according to standard ISO 845) in the left and right hand corner of the initial part of the mould (injection part) and of the final part of the mould (end of the panel), compression strength in the three dimensions (according to standard ISO 844) in the centre of the initial part and in the centre of the final part, dimensional stability (according to standard ISO 2796) of the panels (final part) after storage for 24 hours at room temperature and another 48 hours at -25° C, at 70° C and 90% relative humidity and at 100° C., respectively. The results are given in Table 3.

These results show that foams according to the present invention (Foams No. 2 and 7) have a better density distribution profile than foams of the prior art (Foam No. 1); less variation in density is obtained over the whole of the panel. Also the compression strength is more uniform over the whole panel.

Further improvements are obtained by adding Desmorapid PV (Foam No. 7 vis-a-vis Foam No. 2).

TABLE 2

| Foam No. | | 9 | 10 |
|---|---|---|---|
| POLYOL | | | |
| Polyol E | pbw | 55.4 | 55.4 |
| Polyol B | pbw | 28.5 | 28.5 |
| Polyol F | pbw | 6.7 | 6.7 |
| Surfactant B | pbw | 1.9 | 1.9 |
| Polycat 43 | pbw | 0.5 | 0.5 |
| Catalyst LB | pbw | 1.2 | 1.2 |
| water | pbw | 1.0 | 1.0 |
| Polyol G | pbw | 4.8 | 4.8 |
| Niax A1 | pbw | 0.3 | |
| DMCHA | pbw | 0.6 | |
| DMDEE | pbw | | 2.0 |
| Desmorapid PV | pbw | | 0.8 |
| HCFC 141b | pbw | 25 | 25 |
| POLYISOCYANATE | | | |
| SUPRASEC 2085 | pbw | 220 | 220 |
| Density | g/l | 33.0 | 29.0 |
| Cream time | sec | 18 | 15 |
| String time | sec | 47 | 48 |
| Expansion factor at string time | % | 83.7 | 89.8 |

TABLE 3

| Foam No. | | 1 | 2 | 7 | 7 bis |
|---|---|---|---|---|---|
| Cream time | sec | 17 | 10 | 12 | |
| String time | sec | 154 | 88 | 86 | |
| Free rise density overall/core density | g/l | 23.2 | 23.7 | 23.7 | |
| Initial right hand corner | g/l | 41.5/38.5 | 40.5/37.3 | 38.5/37.2 | 40.7/37.4 |
| Initial left hand corner | g/l | 40.9/38.2 | 40.2/38.1 | 38.9/38.7 | 39.3/37.5 |
| Final right hand corner | g/l | 39.9/33.2 | 41.6/34.9 | 38.6/35.4 | 39.9/36.1 |
| Final left hand corner | g/l | 40.2/34.2 | 40.3/33.9 | 38.8/35.1 | 40.7/37.2 |
| Average | g/l | 40.6/36.0 | 40.6/36.0 | 38.7/36.6 | 40.1/37.0 |
| Compression strength | | | | | |
| Initial length | kPa | 235 | 245 | 211 | 248 |
| Initial thickness | kPa | 193 | 176 | 170 | 174 |
| Initial width | kPa | 182 | 193 | 161 | 180 |
| Initial average | kPa | 203 | 205 | 181 | 200 |
| Initial density | g/l | 37.3 | 36.7 | 37.6 | 35.5 |
| Final length | kPa | 135 | 143 | 134 | 163 |
| Final thickness | kPa | 181 | 191 | 212 | 220 |
| Final width | kPa | 79 | 86 | 176 | 202 |
| Final average | kPa | 131 | 140 | 174 | 195 |
| Final density | g/l | 33.2 | 34.1 | 34.0 | 35.2 |
| Dimentional stability | | | | | |
| at -25° C. | % | 0.15 | 0.2 | -0.3 | -0.3 |
| at 70° C. (RH 90%) | % | -12.5 | -13.1 | -7.5 | -4.2 |
| at 100° C. | % | -3.2 | -4.7 | -2.7 | -2.2 |

EXAMPLE 4

Rigid polyurethane foams were made from a polyol composition and a polyisocyanate composition containing the ingredients listed below in Table 4 at an NCO index of 1.15. The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined. The results are also given in Table 4. These results show that the best results are obtained when dimorpholinodiethylether or N-ethylmorpholine is used as catalyst.

EXAMPLE 5

Rigid polyurethane foams were made from a polyol composition and a polyisocyanate composition containing the ingredients listed below in Table 5 at an NCO index of 1.15. The reaction profile was followed in respect of cream time (time taken for the reaction mixture to start foaming) and string time (time taken for the reaction mixture to reach the transition point from fluid to cross-linked mass). The height of expansion was measured at the string time and also at the end of rise of the foam; from those two figures the expansion factor at string time (height at string/height at end of rise) was determined. The results are also given in Table 5.

TABLE 4

| Foam No. | | 11 | 12 | 13 | 14 | 15 | 16 | 17 | 18 | 19 |
|---|---|---|---|---|---|---|---|---|---|---|
| POLYOL | | | | | | | | | | |
| Polyol A | pbw | 20.5 | 20.5 | 20.5 | 20.5 | 20.5 | 20.5 | 20.5 | 20.5 | 20.5 |
| Polyol B | pbw | 23.0 | 23.0 | 23.0 | 23.0 | 23.0 | 23.0 | 23.0 | 23.0 | 23.0 |
| Polyol C | pbw | 10.0 | 10.0 | 10.0 | 10.0 | 10.0 | 10.0 | 10.0 | 10.0 | 10.0 |
| Polyol D | pbw | 21.0 | 21.0 | 21.0 | 21.0 | 21.0 | 21.0 | 21.0 | 21.0 | 21.0 |
| lactic acid | pbw | 1.1 | 1.1 | 1.1 | 1.1 | 1.1 | 1.1 | 1.1 | 1.1 | 1.0 |
| Fire retardant A | pbw | 8.3 | 8.3 | 8.3 | 8.3 | 8.3 | 8.3 | 8.3 | 8.3 | 8.3 |
| Fire retardant B | pbw | 8.3 | 8.3 | 8.3 | 8.3 | 8.3 | 8.3 | 8.3 | 8.3 | 8.3 |
| Surfactant A | pbw | 2.0 | 2.0 | 2.0 | 2.0 | 2.0 | 2.0 | 2.0 | 2.0 | 2.0 |
| DMBA | pbw | 1 | 1 | 1 | 1 | 1 | 1 | 1 | 1 | 0.6 |
| DMDEE | pbw | 1.5 | | | | | | | | |
| DMP | pbw | | 0.65 | | | | | | | |
| NP | pbw | | | 0.6 | | | | | | |
| NMM | pbw | | | | 1.5 | | | | | |
| DMEA | pbw | | | | | 0.6 | | | | |
| DMAP | pbw | | | | | | 0.3 | | | |
| MM | pbw | | | | | | | 3 | | |
| NBM | pbw | | | | | | | | 3.1 | |
| NEM | pbw | | | | | | | | | 1.5 |
| water | pbw | 3.3 | 3.3 | 3.3 | 3.3 | 3.3 | 3.3 | 3.3 | 3.3 | 3.3 |
| HCFC 141b | pbw | 4.2 | 4.2 | 4.2 | 4.2 | 4.2 | 4.2 | 4.2 | 4.2 | 4.2 |
| POLYISOCYANATE | | | | | | | | | | |
| SUPRASEC DNR | pbw | 139 | 139 | 139 | 139 | 139 | 139 | 139 | 139 | 139 |
| Cream time | sec | 20 | 40 | 37 | 29 | 37 | | 33 | 29 | 19 |
| String time | sec | 110 | 113 | 107 | 92 | 112 | | 109 | 92 | 115 |
| Expansion factor at string time | % | 91.7 | 85.8 | | | | 85.5 | | | 90.5 |

TABLE 5

| Foam No. | | 20 | 21 | 22 | 23 | 24 | 25 | 26 | 27 | 28 | 29 | 30 | 31 |
|---|---|---|---|---|---|---|---|---|---|---|---|---|---|
| POLYOL | | | | | | | | | | | | | |
| Polyol A | pbw | 20.5 | 20.5 | 20.5 | 20.5 | 20.5 | 20.5 | 20.5 | 20.5 | 20.5 | 20.5 | 20.5 | 20.5 |
| Polyol B | pbw | 23.0 | 23.0 | 23.0 | 23.0 | 23.0 | 23.0 | 23.0 | 23.0 | 23.0 | 23.0 | 23.0 | 23.0 |
| Polyol C | pbw | 10.0 | 10.0 | 10.0 | 10.0 | 10.0 | 10.0 | 10.0 | 10.0 | 10.0 | 10.0 | 10.0 | 10.0 |
| Polyol D | pbw | 21.0 | 21.0 | 21.0 | 21.0 | 21.0 | 21.0 | 21.0 | 21.0 | 21.0 | 21.0 | 21.0 | 21.0 |
| malic acid | pbw | 1 | 1 | 1 | 1 | 1 | 1 | 1 | 1 | 1 | 1 | 1 | 1 |
| Fire retardant A | pbw | 8.3 | 8.3 | 8.3 | 8.3 | 8.3 | 8.3 | 8.3 | 8.3 | 8.3 | 8.3 | 8.3 | 8.3 |
| Fire retardant B | pbw | 8.3 | 8.3 | 8.3 | 8.3 | 8.3 | 8.3 | 8.3 | 8.3 | 8.3 | 8.3 | 8.3 | 8.3 |
| Surfactant B | pbw | 2.0 | 2.0 | 2.0 | 2.0 | 2.0 | 2.0 | 2.0 | 2.0 | 2.0 | 2.0 | 2.0 | 2.0 |
| DMBA | pbw | 0.6 | 1 | 0.6 | 0.6 | 0.6 | 0.6 | 0.6 | 0.6 | 0.6 | 0.6 | 0.6 | 0.6 |
| DMDEE | pbw | 1.5 | 0.8 | 0.8 | 0.8 | 0.8 | 0.8 | 0.8 | 0.8 | 0.8 | 0.8 | 0.8 | 0.8 |
| DBTDL | pbw | | | 0.05 | | | 0.03 | | | | 0.02 | | |
| NMI | pbw | | | | 0.2 | | | | | | | | |
| TEA | pbw | | | | | 0.3 | 0.3 | | | | | | |
| Niax A1 | pbw | | | | | | | 0.4 | | | | | |
| Polycat 46 | pbw | | | | | | | | 0.5 | | | | |
| Desmorapid PV | pbw | | | | | | | | | 0.4 | 0.2 | | |
| DMCHA | pbw | | | | | | | | | | | 0.3 | |
| Polycat 41 | pbw | | | | | | | | | | | | 0.4 |

TABLE 5-continued

| Foam No. | | 20 | 21 | 22 | 23 | 24 | 25 | 26 | 27 | 28 | 29 | 30 | 31 |
|---|---|---|---|---|---|---|---|---|---|---|---|---|---|
| water | pbw | 3.3 | 3.3 | 3.3 | 3.3 | 3.3 | 3.3 | 3.3 | 3.3 | 3.3 | 3.3 | 3.3 | 3.3 |
| HCFC 141b | pbw | 4.2 | 4.2 | 4.2 | 4.2 | 4.2 | 4.2 | 4.2 | 4.2 | 4.2 | 4.2 | 4.2 | 4.2 |
| POLYISOCYANATE | | | | | | | | | | | | | |
| SUPRASEC DNR | pbw | 139 | 139 | 139 | 139 | 139 | 139 | 139 | 139 | 139 | 139 | 139 | 139 |
| Cream time | sec | 14 | 16 | 16 | 17 | 14 | 14 | 17 | 15 | 13 | 15 | 15 | 18 |
| String time | sec | 107 | 114 | 105 | 114 | 112 | 89 | 115 | 120 | 107 | 110 | 113 | 105 |
| Expansion factor at string time | % | 91.4 | 89.2 | 90.7 | 89.7 | 89.6 | | 89.4 | | 91.1 | 90.9 | 90.1 | |

What is claimed is:

1. An isocyanate-reactive composition comprising:

0.05–5 wt %, relative to the weight of the isocyanate reactive composition, of a first tertiary amine catalyst; and 0.01–5 wt %, relative to the weight of the isocyanate reactive composition, of a second tertiary amine catalyst;

wherein said first catalyst is selected from the group consisting of 2,2'-dimorpholinodiethylether, 1-methylimidazole, and 4-dimethylaminopyridine, said second catalyst has a $pK_a$ above 12, and said isocyanate reactive composition comprises, relative to the total weight of isocyanate-reactive compounds, at least 10 wt % of polyester polyol.

2. The isocyanate-reactive composition according to claim 1, wherein said composition further comprises a hydroxy-functionalized organic carboxylic acid.

3. The isocyanate-reactive composition according to claim 1, wherein said second catalyst is pentamethyldiethylenetriamine.

4. The isocyanate-reactive composition according to claim 1, wherein said polyester polyol has an average functionality of 1.8 to 8, a hydroxyl number of 15 to 750 mg KOH/g and a molecular weight of 400 to 10,000.

5. The isocyanate-reactive composition according to claim 2, wherein said hydroxy-functionalized carboxylic acid is selected from the group consisting of lactic acid, glycolic acid, malic acid and citric acid.

6. The isocyanate-reactive composition according to claim 5, wherein said carboxylic acid is used as a mixture of citric acid and malic acid in a weight ratio of about 1:1.

7. The isocyanate-reactive composition according to claim 2, wherein said hydroxy-functionalized carboxylic acid is present in an amount ranging from 0.1 to 5 % by weight based on the isocyanate-reactive composition.

8. Rigid polyurethane or urethane-modified polyisocyanurate foams obtained by the isocyanate-reactive composition according to claim 1.

* * * * *